(12) United States Patent
Lee et al.

(10) Patent No.: US 9,171,354 B2
(45) Date of Patent: Oct. 27, 2015

(54) IMAGE PROCESSING APPARATUS AND METHOD FOR ENHANCING THE QUALITY OF AN IMAGE

(71) Applicant: SAMSUNG ELECTRONICS CO., LTD., Suwon-si (KR)

(72) Inventors: Hyun-Seung Lee, Seoul (KR); Jae-Hyun Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/102,557

(22) Filed: Dec. 11, 2013

(65) Prior Publication Data

US 2014/0169691 A1 Jun. 19, 2014

(30) Foreign Application Priority Data

Dec. 13, 2012 (KR) ........................ 10-2012-0145117

(51) Int. Cl.
*G06T 5/00* (2006.01)
*G06T 5/10* (2006.01)
*H04N 19/86* (2014.01)

(52) U.S. Cl.
CPC . *G06T 5/002* (2013.01); *G06T 5/10* (2013.01); *G06T 2207/20021* (2013.01); *G06T 2207/20052* (2013.01); *H04N 19/86* (2014.11)

(58) Field of Classification Search
CPC ............ G06T 5/002; G06T 5/10; G06T 9/00; G06T 2207/20021; G06T 2207/20052; H04N 19/86

USPC ................ 382/232–253; 375/240.01, 240.02, 375/240.18, 240.19; 348/391, 393, 396
See application file for complete search history.

(56) References Cited

U.S. PATENT DOCUMENTS

| | | | | |
|---|---|---|---|---|
| 4,920,426 | A * | 4/1990 | Hatori et al. .................. | 382/239 |
| 5,389,973 | A * | 2/1995 | Kitamura et al. ......... | 375/240.03 |
| 5,461,422 | A * | 10/1995 | Hsieh ....................... | 375/240.03 |
| 5,982,432 | A * | 11/1999 | Uenoyama et al. ...... | 375/240.01 |
| 6,480,547 | B1 * | 11/2002 | Chen et al. ............... | 375/240.27 |
| 6,512,775 | B1 * | 1/2003 | Eleftheriades et al. ....... | 370/428 |
| 6,618,442 | B1 * | 9/2003 | Chen et al. .................. | 375/240.2 |
| 7,006,576 | B1 | 2/2006 | Hannuksela | |
| 7,515,759 | B2 | 4/2009 | Sun | |
| 7,535,383 | B2 | 5/2009 | Segall et al. | |
| 7,650,036 | B2 | 1/2010 | Lei et al. | |
| 7,653,136 | B2 | 1/2010 | Lobo et al. | |
| 7,738,721 | B2 | 6/2010 | Gomila et al. | |
| 7,826,536 | B2 | 11/2010 | Hannuksela et al. | |
| 7,831,990 | B2 | 11/2010 | Visharam et al. | |

(Continued)

*Primary Examiner* — Mekonen Bekele
(74) *Attorney, Agent, or Firm* — Sughrue Mion, PLLC (57) ABSTRACT

An image processing apparatus and method for enhancing quality of image data are provided. The image processing apparatus includes an encoder which encodes source image data and outputs compressed image data, a first representative transform coefficient calculator which calculates a first representative transform coefficient by transforming the source image data into frequency characteristics; a decoder which decodes the compressed image data and outputting decoded image data, a second representative transform coefficient calculator which calculates a second representative transform coefficient by transforming the decoded image data into frequency characteristics, and a quality enhancer which enhances the quality of the decoded image data by using the first representative transform coefficient and the second representative transform coefficient.

18 Claims, 4 Drawing Sheets

(56) References Cited

U.S. PATENT DOCUMENTS

| | | |
|---|---|---|
| 7,852,409 B2 | 12/2010 | Gomila et al. |
| 7,889,939 B2 | 2/2011 | Llach et al. |
| 7,890,556 B2 | 2/2011 | Date et al. |
| 7,899,113 B2 | 3/2011 | Gomila et al. |
| 8,014,558 B2 | 9/2011 | Cooper et al. |
| 8,165,212 B2 * | 4/2012 | Sasai et al. ............... 375/240.18 |
| 8,774,538 B2 * | 7/2014 | Nassor et al. ................. 382/233 |
| 2004/0184529 A1 * | 9/2004 | Henocq et al. ........... 375/240.01 |
| 2005/0286791 A1 * | 12/2005 | Katohgi ........................ 382/252 |
| 2008/0043835 A1 * | 2/2008 | Sasai et al. ............... 375/240.01 |
| 2008/0298702 A1 * | 12/2008 | Gunupudi et al. ............ 382/251 |

* cited by examiner

IMAGE PROCESSING APPARATUS AND METHOD FOR ENHANCING THE QUALITY OF AN IMAGE

PRIORITY

This application claims priority under 35 U.S.C. §119(a) to a Korean Patent Application filed in the Korean Intellectual Property Office on Dec. 13, 2012 and assigned Serial No. 10-2012-0145117, the entire disclosure of which is hereby incorporated by reference, in its entirety.

BACKGROUND

1. Technical Field

The present disclosure generally relates to an image processing apparatus and a method for enhancing the quality of an image by cancelling noises which accompany compressive transmission of image data.

2. Description of the Related Art

Because image data is more voluminous than text data, image data may undergo significant problems with respect to insufficient memory space, a calculation speed of a Central Processing Unit (CPU), and a speed of data transmission. As one approach to solve these problems, techniques for compressing image data have emerged, and through image data compression, a memory space may be efficiently used, and to provide excellent effects may also be obtained in terms of a CPU calculation speed and a data transmission speed. There are standards for compression techniques, such as Joint Photographic Experts Group (JPEG) for still images, Moving Picture Experts Group for audio, and H.261 for dynamic images.

Most image data is processed into digital signals and compression techniques for digital image data are based on transform coding using Discrete Cosine Transform (DCT) for removing redundancy which mainly occurs in a space, and for moving images, which are based on prediction coding using motion compensation of objects between screens, as well as DCT.

SUMMARY

However, as the amount of image data decreases according to a compression rate and the convenience in storage and transmission of the image data increases by using the compression techniques, various noises are generated which degrade the quality of the image data. Hence, there is a need for a scheme for enhancing the quality of an image provided to a user by canceling noises while increasing user convenience in storage and transmission using a compression technique.

Accordingly, aspects of the exemplary embodiments provide an image processing apparatus and a method for enhancing the quality of an image by canceling noises from image data which is compressed and transmitted.

Aspects of the exemplary embodiments also provide an image processing apparatus and method for enhancing the quality of an image by estimating a degradation model function based on source image data information.

According to an aspect of the present invention, there is provided an image processing apparatus which enhances quality of image data, the image processing apparatus including an encoder which encodes source image data and outputs compressed image data, a first representative transform coefficient calculator which calculates a first representative transform coefficient by transforming the source image data into frequency characteristics, a which decodes the compressed image data and outputting decoded image data, a second representative transform coefficient calculator which calculates a second representative transform coefficient by transforming the decoded image data into frequency characteristics, and a quality enhancer which enhances the quality of the decoded image data by using the first representative transform coefficient and the second representative transform coefficient.

According to another aspect of the exemplary embodiments, there is provided an image processing method for enhancing quality of image data in an image processing apparatus, the image processing method including encoding, by an encoder, encoding source image data and outputting compressed image data; calculating, by a first representative transform coefficient calculator, a first representative transform coefficient by transforming the source image data into frequency characteristics; decoding, by a decoder, the compressed image data and outputting decoded image data; calculating, by a second representative transform coefficient calculator, a second representative transform coefficient by transforming the decoded image data into frequency characteristics, and enhancing, through a quality enhancer, quality of the decoded image data by using the first representative transform coefficient and the second representative transform coefficient.

Another aspect of the exemplary embodiments may provide an image processing apparatus for enhancing the quality of image data including: a first representative transform coefficient calculator which calculates a first representative transform coefficient by transforming received source image data into frequency characteristics; a second representative transform coefficient calculator which calculates a second representative transform coefficient by transforming received decoded image data into frequency characteristics; and an image quality enhancer which enhances the quality of the decoded image data by using the first representative transform coefficient and the second representative transform coefficient. The image processing apparatus may further provide an encoder which encodes source image data and outputs compressed image data to the first representative transform coefficient calculator.

An exemplary embodiment may further provide a decoder which decodes the compressed image data and outputs the decoded image data to the second representative transform coefficient calculator. In addition, a degradation model function calculator may receive the second representative transform coefficient and the first representative transform coefficient and output a degradation model function to the image quality enhancer.

BRIEF DESCRIPTION OF THE DRAWINGS

The above and other features and advantages of the exemplary embodiments will be more apparent from the following detailed description taken in conjunction with the accompanying drawings, in which.

DETAILED DESCRIPTION OF THE EMBODIMENTS

Hereinafter, exemplary embodiments of the present disclosure will be described with reference to the accompanying drawings. A detailed description of known functions and configurations will be omitted when it may unnecessarily obscure the subject matter of the present disclosure. Terminologies used below are defined considering functions in the disclosure or as now they would be understood by one of ordinary skill in the art, and the terminologies can be changed according to a user, an operator's intention, or custom.

Figure 1:
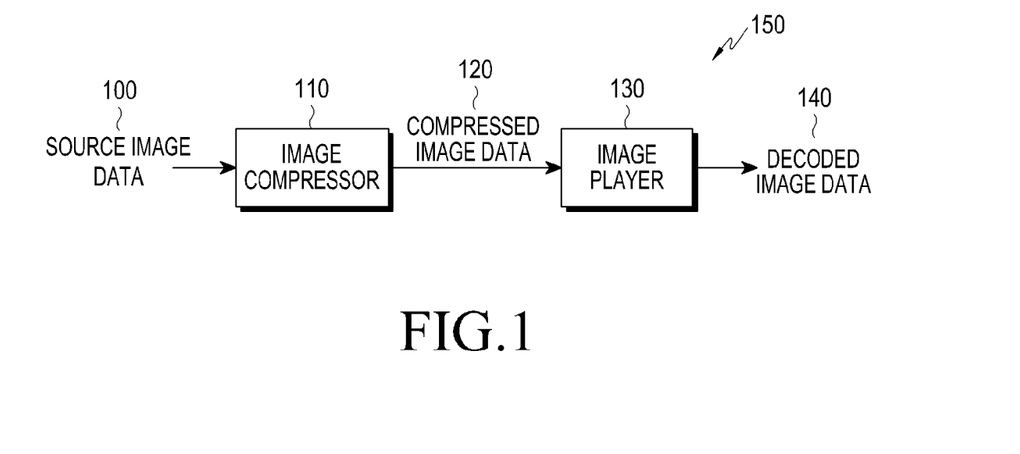
FIG. 1 is a block diagram which illustrates a general image processing apparatus.

FIG. 1 is a block diagram which illustrates a general image processing apparatus 150.

Referring to FIG. 1, the image processing apparatus 150 includes an image compressor 110 and an image player 130.

Source image data 100 is input to the image compressor 110 which then compresses the input source image data 100 according to a preset compression technique and outputs the compressed image data 120.

The compressed image data 120 is input to the image player 130 which decodes the input compressed image data 120 and outputs the decoded image data 140.

However, until the source image data 100 is output as the decoded image data 140 after passing through the image compressor 110 and the image player 130, various noises may occur which can degrade image quality, and these noises may largely damage the quality of the decoded image data 140.

Herein below, a description will be made of a scheme for enhancing the image quality by cancelling the noises from the decoded image data 140, and especially, a scheme for effectively enhancing the quality of the image data by accurately estimating the degradation of the image data, based on source image data information.

Figure 2:
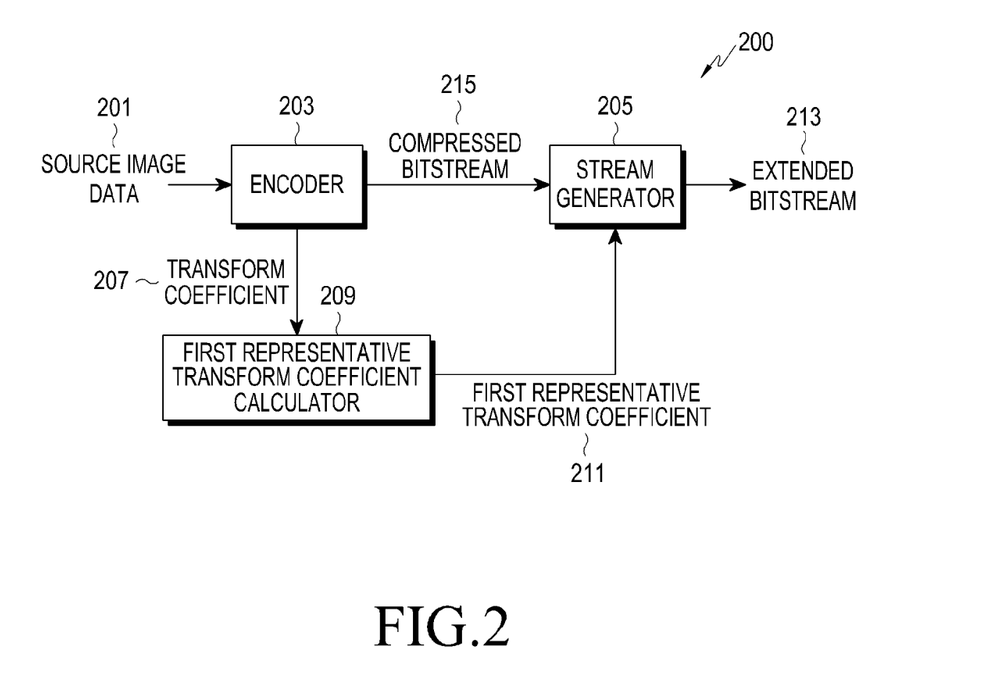
FIG. 2 is a block diagram which illustrates an image compressor of an image processing apparatus according to an exemplary embodiment.

FIG. 2 is a block diagram which illustrates an image compressor 200 of an image processing apparatus according to an exemplary embodiment.

Referring to FIG. 2, the image compressor 200 includes an encoder 203, a stream generator 205, and a first representative transform coefficient calculator 209.

Source image data 201 is input to the encoder 203 which then compresses the input source image data 201 according to a predetermined compression technique and outputs the compressed image data, for example, a compressed bitstream 215.

The encoder 203 outputs a transform coefficient 207, for example, (i,j), for calculating a representative transform coefficient (which will be referred to as a first representative transform coefficient) 211 of the source image data 201. The transform coefficient 207 may be calculated by a transform coefficient calculator (not shown) which may be added as a separate component to the encoder 203, inside or outside the encoder 203. Assuming that the source image data 201 is composed of N×N blocks, 'i' represents an index which indicates a row of the N×N block matrix and 'j' represents an index indicating a column of the N×N block matrix.

The transform coefficient 207, (i,j), is input to the first representative coefficient calculator 209 which then performs transformation with respect to the source image data 201 in N×N block units and takes an absolute value of the resulting value, that is, an N×N block-based transform value. For the transformation, various methods which represent image data with frequency characteristics may be used, and transform coding using Discrete Cosine Transform (DCT) may be used as a representative method. Such process is performed with respect to the source image data 201 in units of blocks or pixels forming the blocks, and an average value of the N×N block-based transform values calculated with respect to the whole source image data 201 is calculated to ascertain a representative transform coefficient with respect to the source image data 201, that is, the first representative transform coefficient 211.

The first representative transform coefficient 211 represents local frequency characteristics of the source image data 201, and may be calculated using:

$$T_{enc}(i,j) = (\Sigma_{i=0}^{k-1} |T_s(i,j)|)/k \qquad (1),$$

where $T_{enc}(i,j)$ represents a first representative transform coefficient with respect to source image data, k represents a total number of blocks which form source image data, and $|T_s(i,j)|$ represents an absolute value of an N×N block-based transform value of the source image data.

The compressed bitstream 215 and the first representative transform coefficient 211 are input to a stream generator 205 which then adds the first representative transform coefficient 211 to the compressed bitstream 215 to generate and output an extended bitstream 213. For example, the first representative transform coefficient 211 is inserted into a user designated space of a Supplement Enhancement Information (SEI) header, and an SEI message may be sent for each frame or may be sent for each sequence depending on the amount of information of the first representative transform coefficient 211.

Figure 3:
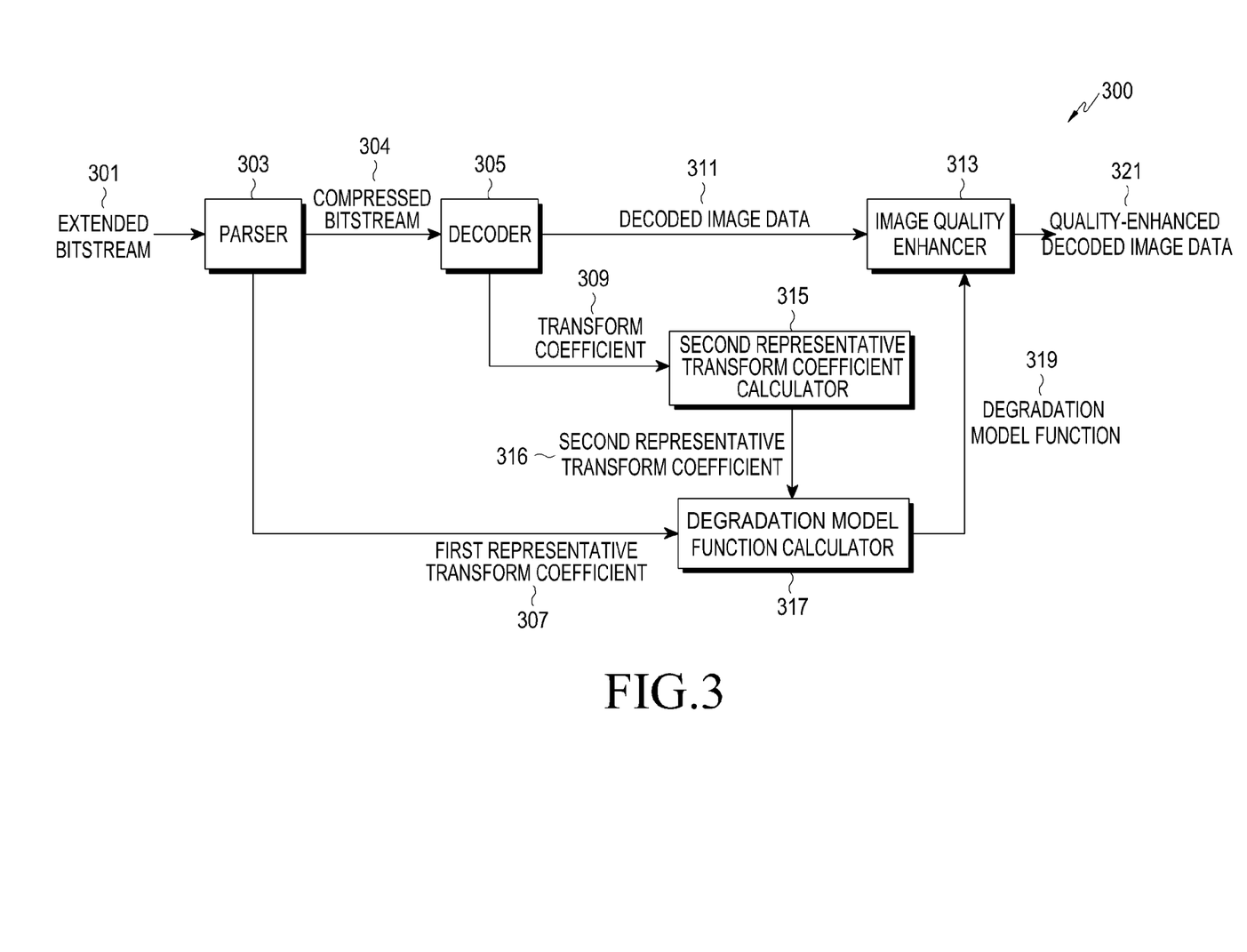
FIG. 3 is a block diagram which illustrates an image player of an image processing apparatus according to an exemplary embodiment.

FIG. 3 is a block diagram which illustrates an image player 300 of an image processing apparatus according to an exemplary embodiment.

Referring to FIG. 3, the image player 300 includes a parser 303, a decoder 305, a second representative transform coefficient calculator 315, a degradation model function calculator 317 and a quality enhancer 313.

An extended bitstream 301 output from the image compressor 200 is input to the parser 303 which then separates the extended bitstream 301 into a compressed bitstream 304 and a first representative transform coefficient 307, and outputs them.

The compressed bitstream 304 is input to the decoder 305 which then decodes the compressed bitstream 304 to output decoded image data 311. The decoder 305 outputs a transform coefficient 309, for example, (i,j), for calculating a representative transform coefficient (which will be referred to as a second representative transform coefficient) 316 of the decoded image data 311. The transform coefficient 309 may be calculated by a transform coefficient calculator (not shown) which may be added as a separate component to the decoder 305 inside or outside the decoder 305.

The transform coefficient 309, (i,j), is input to the second representative coefficient calculator 315 which then performs transformation with respect to the decoded image data 311 in N×N block units and takes an absolute value of the resulting value, that is, an N×N block-based transform value. For the transformation, various methods which represent image data with frequency characteristics may be used, and transform coding using Discrete Cosine Transform (DCT) may be used as a representative method. Such process is performed with respect to the decoded image data 311 in units of blocks or pixels forming the blocks, and an average value of the N×N block-based transform values calculated with respect to the whole decoded image data 311 is calculated to ascertain a representative transform coefficient with respect to the decoded image data 311, that is, the second representative transform coefficient 316.

The second representative transform coefficient 316 represents local frequency characteristics of the decoded image data 311, and may be calculated using:

$$T_{dec}(i,j) = (\Sigma_{i=0}^{k-1}|T_d(i,j)|)/k \quad (2),$$

where $T_{dec}(i,j)$ represents a second representative transform coefficient with respect to decoded image data, k represents a total number of blocks which form decoded image data, and $|T_d(i,j)|$ represents an absolute value of an N×N block-based transform value of the decoded image data.

A first representative transform coefficient 307 calculated using Equation 1 and the second representative transform coefficient 316 calculated using Equation 2 are input to the degradation model function calculator 317 which then calculates a degradation model function 319 of the image processing apparatus, according to an exemplary embodiment.

The degradation model function 319 is calculated by dividing the second representative transform coefficient 316 by the first representative transform coefficient 307, as given by:

$$g(i,j) = T_{dec}(i,j)/T_{enc}(i,j) \quad (3),$$

wherein $g(i,j)$ represents a degradation model function in an N×N block matrix, $T_{dec}(i,j)$ represents a second representative transform coefficient with respect to decoded image data, and $T_{enc}(i,j)$ represents a first representative transform coefficient with respect to source image data.

For example, assuming that image data is composed of 8×8 blocks, the first representative transform coefficient 307 and the second representative transform coefficient 316 may be represented as shown in Table 1 and Table 2, respectively. Table 1 shows the first representative transform coefficient 307 with respect to source image data, and Table 2 shows the second representative transform coefficient 316 with respect to decoded image data.

TABLE 1

| 0 | 489 | 208 | 113 | 75 | 53 | 39 | 33 |
|---|---|---|---|---|---|---|---|
| 278 | 192 | 125 | 88 | 58 | 44 | 35 | 30 |
| 107 | 107 | 92 | 68 | 49 | 39 | 32 | 27 |
| 61 | 61 | 59 | 51 | 41 | 33 | 28 | 24 |
| 41 | 41 | 41 | 39 | 33 | 28 | 24 | 22 |
| 31 | 30 | 30 | 29 | 27 | 24 | 22 | 21 |
| 25 | 25 | 23 | 23 | 23 | 21 | 20 | 19 |
| 23 | 22 | 21 | 20 | 20 | 20 | 19 | 18 |

TABLE 2

| 0 | 490 | 208 | 111 | 66 | 33 | 16 | 8 |
|---|---|---|---|---|---|---|---|
| 278 | 191 | 123 | 81 | 47 | 20 | 12 | 7 |
| 105 | 104 | 88 | 58 | 31 | 16 | 6 | 5 |
| 58 | 55 | 50 | 36 | 20 | 6 | 4 | 3 |
| 34 | 31 | 24 | 17 | 9 | 3 | 2 | 3 |
| 19 | 12 | 8 | 7 | 3 | 2 | 2 | 2 |
| 4 | 3 | 2 | 3 | 2 | 2 | 2 | 2 |
| 2 | 2 | 2 | 2 | 2 | 2 | 2 | 2 |

The degradation model function 319 corresponding to the first representative transform coefficient 307 shown in Table 1 and the second representative transform coefficient 316 shown in Table 2 may be represented as shown in Table 3. The degradation model function 319 is also in the form of an 8×8 block matrix in which a coefficient corresponding to each block has a value between 0 and 1 and indicates a degradation degree of frequency components.

That is, a coefficient of 1 indicates that a frequency component is not damaged at all, and a coefficient of 0 indicates that a frequency component is totally damaged. In most compressed image data, a coefficient corresponding to a low frequency (a DC coefficient), for example, a coefficient $g(1,1)$ has a value of 1 because no damage occurs and a coefficient corresponding to a high frequency (an AC coefficient), for example, a coefficient $g(8,8)$ approaches 0 as a damage is intensified toward the high frequency (AC coefficient).

As such, the degradation model function 319 indicates a degree of a damage of quality due to compression of image data. Thus, more values close to 1 mean that image data is losslessly compressed and more values close to 0 mean that damage occurs due to compression of image data.

TABLE 3

| 1.00 | 1.00 | 1.00 | 0.98 | 0.87 | 0.62 | 0.40 | 0.23 |
|---|---|---|---|---|---|---|---|
| 1.00 | 1.00 | 0.98 | 0.93 | 0.80 | 0.45 | 0.34 | 0.23 |
| 0.98 | 0.98 | 0.96 | 0.85 | 0.62 | 0.42 | 0.19 | 0.17 |
| 0.95 | 0.90 | 0.85 | 0.72 | 0.48 | 0.19 | 0.16 | 0.13 |
| 0.83 | 0.76 | 0.58 | 0.44 | 0.26 | 0.12 | 0.09 | 0.12 |
| 0.60 | 0.40 | 0.26 | 0.22 | 0.13 | 0.10 | 0.10 | 0.11 |
| 0.17 | 0.13 | 0.10 | 0.11 | 0.09 | 0.10 | 0.11 | 0.11 |
| 0.11 | 0.10 | 0.11 | 0.10 | 0.11 | 0.11 | 0.11 | 0.12 |

The degradation model function 319 is input to the image quality enhancer 313 which then applies the degradation model function 319 to the decoded image data 311 to output quality-enhanced decoded image data 321. For image quality enhancement, conventional various degradation model-based image reconstruction schemes may be used, representative schemes of which may include an inverse filtering scheme and a wiener filtering scheme. The inverse filtering scheme and the wiener filtering scheme are not closely related to the exemplary embodiments and thus will not be described herein.

Figure 4:
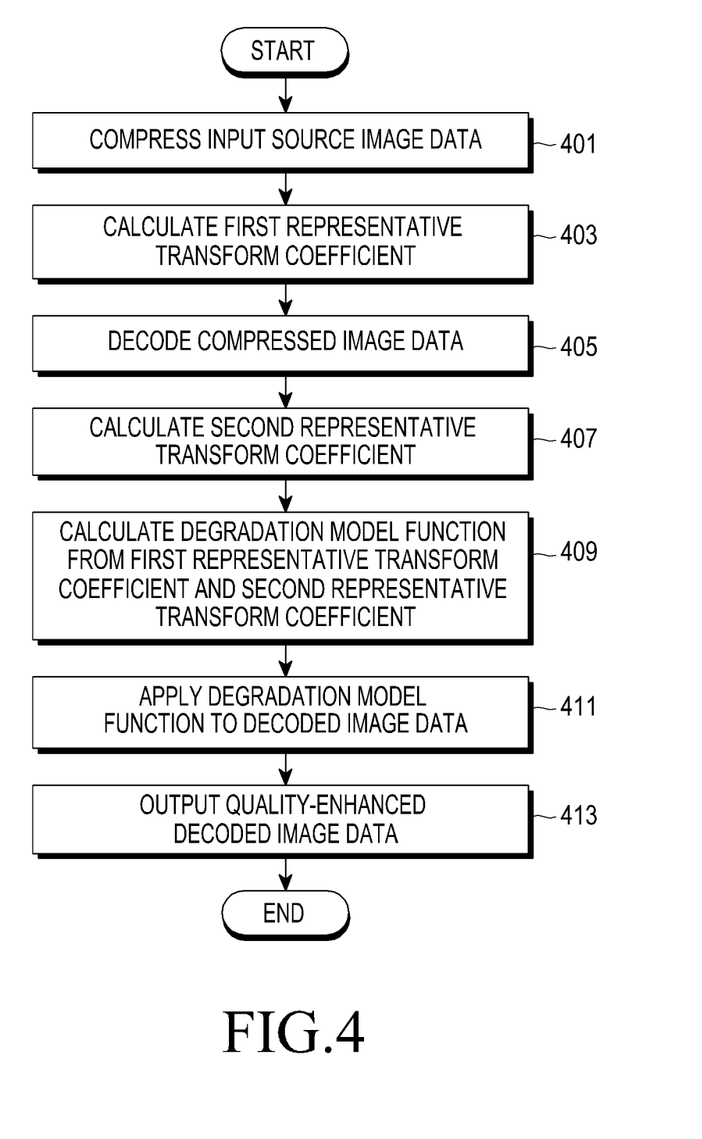
FIG. 4 is a flowchart which illustrates a process of enhancing the quality of image data in an image processing apparatus according to an exemplary embodiment.

FIG. 4 is a flowchart which illustrates a process of enhancing the quality of image data in the image processing apparatus according to an exemplary embodiment.

Referring to FIG. 4, the image compressor of the image processing apparatus input source image data in step 401 and proceeds to step 403 to calculate a first representative transform coefficient with respect to the source image data.

The image player of the image processing apparatus decodes compressed image data in step 405 and proceeds to step 407 to calculate a second representative transform coefficient with respect to decoded image data. The image player proceeds to step 409 to calculate a degradation model function from the first representative transform coefficient and the second representative transform coefficient.

The image player of the image processing apparatus applies the degradation model function to the decoded image data in step 411 and proceeds to step 413 to output quality-enhanced decoded image data.

Figure 5:
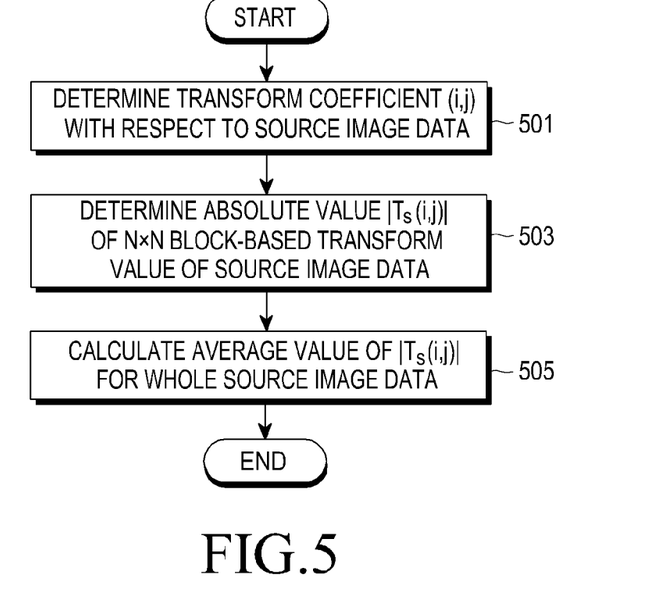
FIG. 5 is a flowchart which illustrates a process of calculating a first representative transform coefficient used in estimation of a degradation model function in an image processing apparatus, according to an exemplary embodiment.

FIG. 5 is a flowchart which illustrates a process of calculating the first representative transform coefficient used in estimation of the degradation model function in the image processing apparatus according to an exemplary embodiment.

Referring to FIG. 5, the first representative transform coefficient calculator included in the image compressor of the image processing apparatus determines a transform coefficient (i,j) with respect to source image data in step 501 and proceeds to step 503. Herein, at step 503 the transform coefficient (i,j) represents an index indicating a row and a column of a block matrix forming the source image data.

In step 503, the first representative transform coefficient calculator determines an absolute value $|T_s(i,j)|$ of an N×N block-based transform value of the source image data and proceeds to step 505. Herein, transformation means transformation which represents image data with frequency characteristics.

In step 505, the first representative transform coefficient calculator calculates an average value of the absolute values $|T_s(i,j)|$ of the whole source image data, that is, the respective blocks of the source image data, in order to acquire the first representative transform coefficient used for estimation of the degradation model function.

Figure 6:
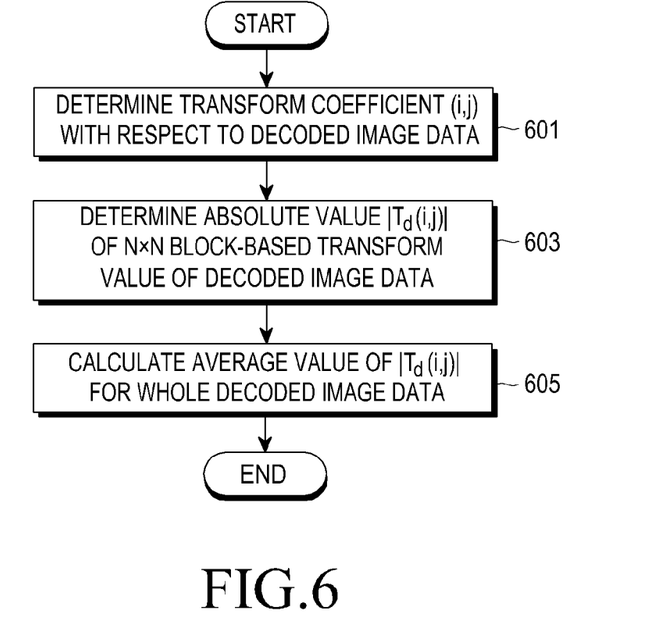
FIG. 6 is a flowchart which illustrates a process of calculating a second representative transform coefficient used in estimation of a degradation model function in an image processing apparatus, according to an exemplary embodiment.

FIG. 6 is a flowchart which illustrates a process of calculating the second representative transform coefficient used in estimation of the degradation model function in the image processing apparatus according to an exemplary embodiment.

Referring to FIG. 6, the second representative transform coefficient calculator included in the image player of the image processing apparatus determines a transform coefficient (i,j) with respect to decoded image data acquired by decoding the compressed image in step 601 and proceeds to step 603. Herein, the transform coefficient (i,j) represents an index which indicates a row and a column of a block matrix forming the decoded image data.

In step 603, the second representative transform coefficient calculator determines an absolute value $|T_d(i,j)|$ of an N×N block-based transform value of the decoded image data and proceeds to step 605. Herein, transformation means transformation which represents image data with frequency characteristics.

In step 605, the second representative transform coefficient calculator calculates an average value of the absolute values $|T_d(i,j)|$ of the whole decoded image data, that is, the respective blocks of the decoded image data, to acquire the second representative transform coefficient used for estimation of the degradation model function.

The image processing apparatus according to an exemplary embodiment estimates a degradation model function from the first representative transform coefficient with respect to the source image data and the second representative transform coefficient with respect to the decoded image data, thereby accurately estimating degradation of image data.

Moreover, by accurately estimating degradation of image data based on source image data information, image quality may be enhanced in an excellent manner.

The image processing method and apparatus for enhancing the quality of an image according to the exemplary embodiments may receive and store the program from a program providing device connected in a wired or wireless manner. The program providing device may include a memory for storing a program including instructions for instructing the image processing apparatus to execute a preset image processing method, information necessary for the image processing method, a communicator for performing wired or wireless communication with the image processing apparatus, and a controller for transmitting a corresponding program to the image processing apparatus at the request of the image processing apparatus or automatically.

The image processing method and apparatus for enhancing the quality of an image according to the exemplary embodiments can be implemented with hardware, software, or a combination of hardware and software. Such arbitrary software may be stored, whether or not erasable or re-recordable, in a volatile or non-volatile storage such as a ROM; a memory such as a RAM, a memory chip, a device, or an integrated circuit; and an optically or magnetically recordable and machine (e.g., computer)-readable storage medium such as a Compact Disc (CD), a Digital Versatile Disk (DVD), a magnetic disk, or a magnetic tape. The image processing method and apparatus for enhancing the quality of an image according to exemplary embodiments may be implemented by a computer or a portable terminal that includes a controller and a memory. The memory is an example of a machine-readable storage medium that is suitable for storing a program or programs including instructions for implementing the exemplary embodiments.

Therefore, the exemplary embodiments may include a program including codes for implementing an apparatus or method claimed in an arbitrary claim and a non-transitory machine-readable storage medium for storing such a program. The program may be electronically transferred through an arbitrary medium, such as a communication signal delivered through wired or wireless connection, and exemplary embodiments properly include equivalents thereof.

The image processing method and apparatus for enhancing the quality of an image according to the embodiments of the present invention may receive and store the program from a program providing device connected in a wired or wireless manner. The program providing device may include a memory for storing a program including instructions for instructing the image processing apparatus to execute a preset image processing method, information necessary for the image processing method, a communication unit for performing wired or wireless communication with the image processing apparatus, and a controller for transmitting a corresponding program to the image processing apparatus at the request of the image processing apparatus or automatically.

While the present disclosure has been particularly illustrated and described with reference to certain exemplary embodiments thereof, various modifications or changes can be made without departing from the scope of the present invention. Therefore, the scope is not limited to the disclosed embodiments, and it should be defined by the scope of the following claims and equivalents thereof.

What is claimed is:

1. An image processing apparatus for enhancing the quality of image data, the image processing apparatus comprising:
   an encoder which encodes source image data and outputs compressed image data;
   a first representative transform coefficient calculator which calculates a first representative transform coefficient by transforming the source image data into frequency characteristics;
   a decoder which decodes the compressed image data and outputs the decoded image data;
   a second representative transform coefficient calculator which calculates a second representative transform coefficient by transforming the decoded image data into frequency characteristics;
   a degradation model function calculator which calculates a degradation model function by dividing the second representative transform coefficient by the first representative transform coefficient for each transform efficient; and
   a quality enhancer which enhances the quality of the decoded image data by using the degradation model function.

2. The image processing apparatus of claim 1, wherein the first representative transform coefficient calculator determines a transform coefficient with respect to the source image data, determines an absolute value of an N×N block-based transform value of the source image data, and calculates an average value of absolute values of N×N block-based transform values for respective blocks forming the source image data, thereby calculating the first representative transform coefficient.

3. The image processing apparatus of claim 2, wherein the first representative transform coefficient is calculated using:

$$T_{enc}(i,j)=(\Sigma_{i=0}^{k-1}|T_s(i,j)|)/k,$$

where $T_{enc}(i,j)$ represents the first representative transform coefficient, k represents a total number of blocks which form the source image data, and $|T_s(i,j)|$ represents an absolute value of the N×N block-based transform value of the source image data.

4. The image processing apparatus of claim 1, wherein the second representative transform coefficient calculator determines a transform coefficient with respect to the decoded image data, determines an absolute value of an N×N block-based transform value of the decoded image data, and calculates an average value of absolute values of N×N block-based transform values for respective blocks forming the decoded image data, thereby calculating the second representative transform coefficient.

5. The image processing apparatus of claim 4, wherein the second representative transform coefficient is calculated using:

$$T_{dec}(i,j)=(\Sigma_{i=0}^{k-1}|T_d(i,j)|)/k,$$

where $T_{dec}(i,j)$ represents the second representative transform coefficient, k represents a total number of blocks which form the decoded image data, and $|T_d(i,j)|$ represents an absolute value of the N×N block-based transform value of the decoded image data.

6. The image processing apparatus of claim 1, wherein the degradation model function is calculated by:

$$g(i,j)=T_{dec}(i,j)/T_{enc}(i,j),$$

wherein $g(i,j)$ represents a degradation model function in the form of an N×N block matrix, $T_{dec}(i,j)$ represents the second representative transform coefficient, and $T_{enc}(i,j)$ represents the first representative transform coefficient.

7. The image processing apparatus of claim 1, further comprising a stream generator which adds the first representative transform coefficient to a bitstream of the compressed image data to output an extended bitstream.

8. The image processing apparatus of claim 7, further comprising a parser which separates the extended bitstream into a compressed bitstream and the first representative transform coefficient.

9. An image processing method for enhancing quality of image data in an image processing apparatus, the image processing method comprising:
encoding, by an encoder, encoding source image data and outputting the compressed image data;
calculating, by a first representative transform coefficient calculator, a first representative transform coefficient by transforming the source image data into frequency characteristics;
decoding, by a decoder, the compressed image data and outputting decoded image data;
calculating, by a second representative transform coefficient calculator, a second representative transform coefficient by transforming the decoded image data into frequency characteristics;
calculating, by a degradation model function calculator, a degradation model function by dividing the second representative transform coefficient by the first representative transform coefficient for each transform efficient; and
enhancing, by a quality enhancer, the quality of the decoded image data by using the degradation model function.

10. The image processing method of claim 9, wherein the calculating of the first representative transform coefficient comprises:
determining a transform coefficient with respect to the source image data;
determining an absolute value of an N×N block-based transform value of the source image data; and
calculating an average value of absolute values of N×N block-based transform values for respective blocks forming the source image data.

11. The image processing method of claim 10, wherein the first representative transform coefficient is calculated using:

$$T_{enc}(i,j)=(\Sigma_{i=0}^{k-1}|T_s(i,j)|)/k,$$

where $T_{enc}(i,j)$ represents the first representative transform coefficient, k represents a total number of blocks which form the source image data, and $|T_s(i,j)|$ represents an absolute value of the N×N block-based transform value of the source image data.

12. The image processing method of claim 9, wherein the calculation of the second representative transform coefficient comprises:
determining a transform coefficient with respect to the decoded image data;
determining an absolute value of an N×N block-based transform value of the decoded image data; and
calculating an average value of absolute values of N×N block-based transform values for respective blocks forming the decoded image data.

13. The image processing method of claim 12, wherein the second representative transform coefficient is calculated using:

$$T_{dec}(i,j)=(\Sigma_{i=0}^{k-1}|T_d(i,j)|)/k,$$

where $T_{dec}(i,j)$ represents the second representative transform coefficient, k represents a total number of blocks which form the decoded image data, and $|T_d(i,j)|$ represents an absolute value of the N×N block-based transform value of the decoded image data.

14. The image processing method of claim 9, wherein the degradation model function is calculated by:

$$g(i,j)=T_{dec}(i,j)/T_{enc}(i,j),$$

wherein $g(i,j)$ represents a degradation model function in the form of an N×N block matrix, $T_{dec}(i,j)$ represents the second representative transform coefficient, and $T_{enc}(i,j)$ represents the first representative transform coefficient.

15. The image processing method of claim 9, further comprising adding, by a stream generator, the first representative transform coefficient to a bitstream of the compressed image data to output an extended bitstream.

16. The image processing method of claim 15, further comprising separating, by a parser, the extended bitstream into a compressed bitstream and the first representative transform coefficient.

17. An image processing apparatus for enhancing the quality of image data, the image processing apparatus comprising:

a first representative transform coefficient calculator which calculates a first representative transform coefficient by transforming received source image data into frequency characteristics;

a second representative transform coefficient calculator which calculates a second representative transform coefficient by transforming received decoded image data into frequency characteristics;

a degradation model function calculator which calculates a degradation model function by dividing the second representative transform coefficient by the first representative transform coefficient for each transform efficient; and an image quality enhancer which enhances the quality of the decoded image data by using the first representative transform coefficient and the second representative transform coefficient.

18. The image processing apparatus for enhancing the quality of image data of claim 17, further comprising a decoder which decodes the compressed image data and outputs the decoded image data to the second representative transform coefficient calculator.

\* \* \* \* \*